(12) United States Patent
Afzelius

(10) Patent No.: US 9,635,556 B2
(45) Date of Patent: Apr. 25, 2017

(54) AUTOMATIC LOGIN ON A WEBSITE BY MEANS OF AN APP

(71) Applicant: SPOTIFY AB, Stockholm (SE)

(72) Inventor: Jens Afzelius, Stockholm (SE)

(73) Assignee: SPOTIFY AB (SE)

( * ) Notice: Subject to any disclaimer, the term of this patent is extended or adjusted under 35 U.S.C. 154(b) by 0 days.

(21) Appl. No.: 14/711,178

(22) Filed: May 13, 2015

(65) Prior Publication Data

US 2016/0337854 A1 Nov. 17, 2016

(51) Int. Cl.
| | | |
|---|---|---|
| *H04W 12/08* | (2009.01) | |
| *H04L 29/06* | (2006.01) | |
| *G06F 21/41* | (2013.01) | |

(52) U.S. Cl.
CPC ............ *H04W 12/08* (2013.01); *G06F 21/41* (2013.01); *H04L 63/0815* (2013.01)

(58) Field of Classification Search
CPC .................................................. H04L 63/0807
See application file for complete search history.

(56) References Cited

U.S. PATENT DOCUMENTS

| | | | |
|---|---|---|---|
| 8,615,548 | B1 * | 12/2013 | Juillard .......................... 709/203 |
| 2009/0249078 | A1 | 10/2009 | Kim |
| 2011/0289537 | A1 * | 11/2011 | Buehl ............................. 725/98 |
| 2013/0086670 | A1 | 4/2013 | Vangpat |
| 2014/0157377 | A1 | 6/2014 | Kiryakos |

FOREIGN PATENT DOCUMENTS

| | | |
|---|---|---|
| EP | 3093786 | 11/2016 |
| WO | 2015010558 | 1/2015 |

OTHER PUBLICATIONS

European Patent Office, Publication Notice for European Patent Application No. 15167489.2 (Publication No. EP 3093786), Oct. 19, 2016, 2 pages.
European Patent Office, International Searching Authority, Extended European Search Report for European Patent Application No. 15167489.2, Oct. 15, 2015, 7 pages.

(Continued)

*Primary Examiner* — Harunur Rashid
*Assistant Examiner* — Thanh Le
(74) *Attorney, Agent, or Firm* — Tucker Ellis, LLP

(57) ABSTRACT

The present disclosure relates to a method performed for facilitating login on a website. In accordance with an embodiment, the method comprises, by means of a web browser in a radio device, downloading a web page of the website from a web server hosting the website; receiving a login request from the web server, the login request comprising a request for login information for a service from a service application of the service in the radio device; and, in response to the received login request and by means of the service application, automatically sending a login token request to a server of a service provider providing the service. In accordance with an embodiment, the method also comprises, from the server of the service provider, receiving a login token response comprising a login token, and sending a login information message to the web server comprising the login token.

22 Claims, 3 Drawing Sheets

(56) References Cited

OTHER PUBLICATIONS

European Patent Office, International Searching Authority, Examination Report for European Patent Application No. 15167489.2, Nov. 21, 2016, 5 pages.

Hardt, D., et al., "OAuth Web Resource Authorization Profiles", Jan. 15, 2010, retrieved from <http://tools.ietf.org/pdf/draft-hardt-oauth-01.pdf> on Nov. 23, 2016, 40 pages.

Hammer-Lahav, E., et al., "The OAuth 1.0 Protocol—RFC5849", retrieved from <https://tools.ietf.org/html/rfc5849> on Nov. 23, 2016, 38 pages.

* cited by examiner

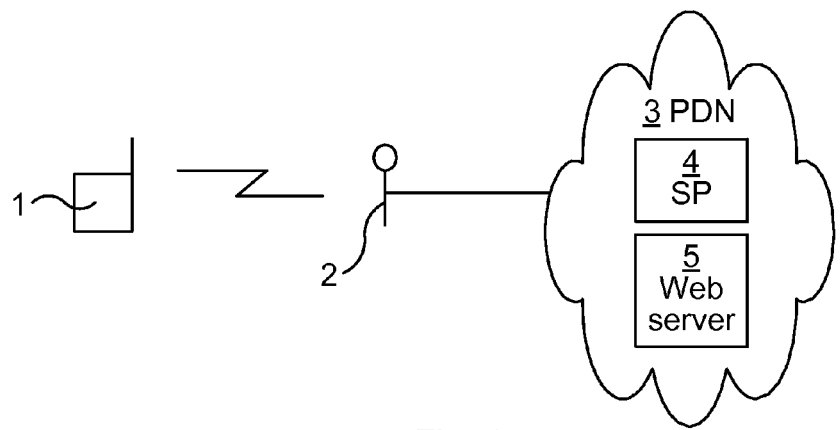
Fig. 1
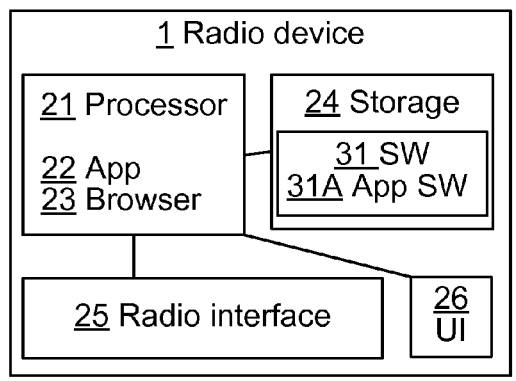 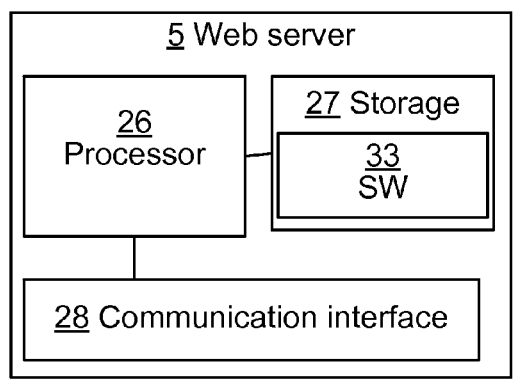
Fig. 2A          Fig. 2B
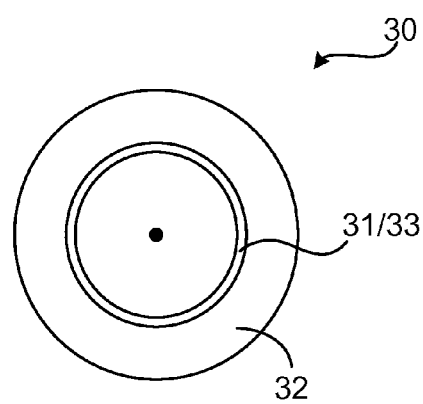
Fig. 3

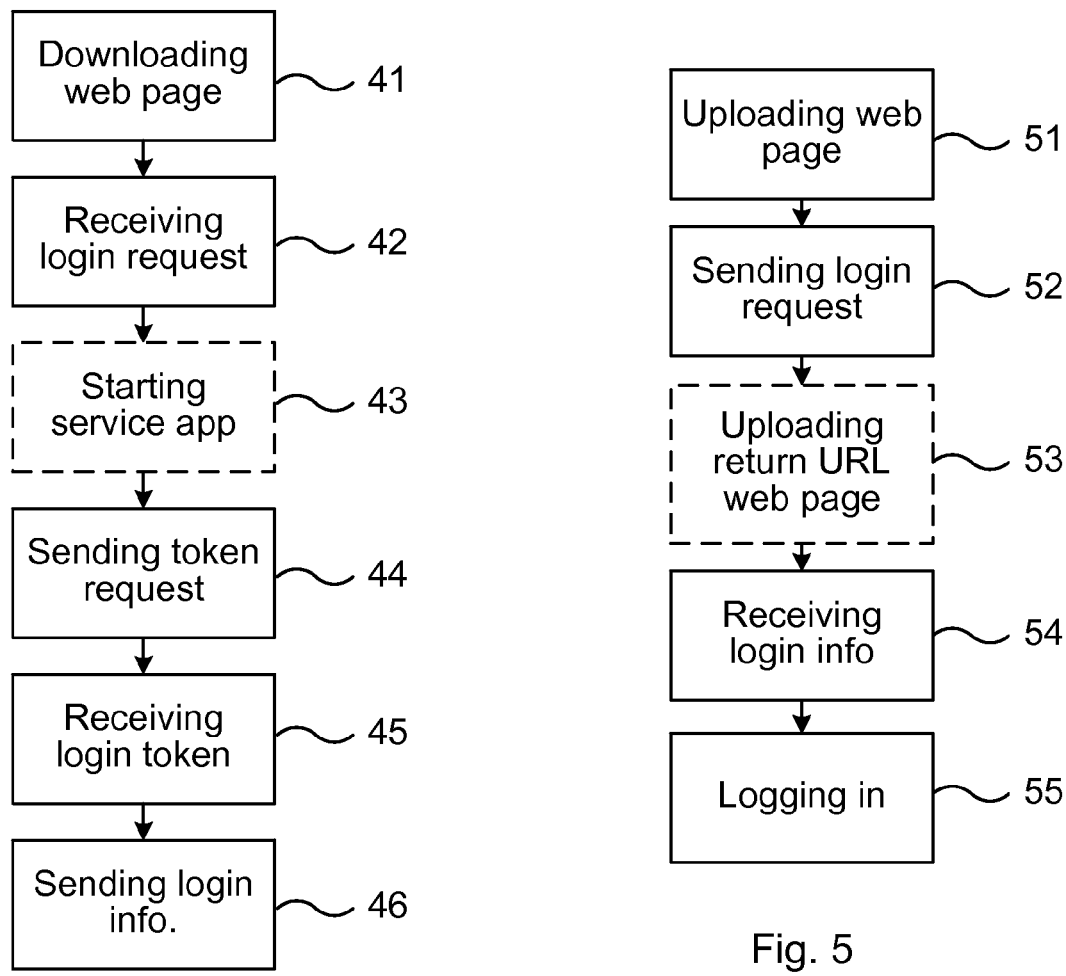

AUTOMATIC LOGIN ON A WEBSITE BY MEANS OF AN APP

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present disclosure relates to methods and devices for facilitating login on a website.

BACKGROUND

A service provider, e.g. providing a media streaming service, may provide the service via either or both of a web application on a web site of the service provider and a service application (app/client) installed on a user device such as a smartphone. A user may be logged into the service via the web site and/or via the app. The user may even be logged in via the web site from the same smartphone which has the app installed thereon, by means of a web browser installed on the smartphone. The user may e.g. be continuously logged in via the app (since there may be no reason to log out from the service since the smartphone is only used by the user) while only occasionally logging in via the web site (for instance for performing payments or the like which is not supported via the app). The user than has to remember his/her user name and password, and log in also via the web site.

SUMMARY

It is an objective of the present invention to facilitate login on a website by a radio device by taking advantage of the fact that the user is already logged into a service application running on the radio device. The website may be part of the corresponding web application of the service of the service application whereby login to the service via the web site is facilitated by the user already being logged in to the service via the app.

According to an aspect of an embodiment of the present invention, there is provided a method performed in a radio device for facilitating login on a website. The method comprises, by means of a web browser in the radio device, downloading a web page of the website from a web server hosting the website. The method also comprises receiving a login request from the web server, the login request comprising a request for login information for a service from a service application of the service in the radio device. The method also comprises, in response to the received login request and by means of the service application, automatically sending a login token request to a server of a service provider providing the service. The method also comprises, from the server of the service provider, receiving a login token response comprising a login token. The method also comprises, to the web server, sending a login information message comprising the login token.

According to another aspect of an embodiment, there is provided a computer program product comprising computer-executable components for causing a radio device to perform an embodiment of the method performed in the radio device, when the computer-executable components are run on processor circuitry comprised in the radio device.

According to another aspect of an embodiment, there is provided a radio device comprising processor circuitry, and a storage unit storing instructions executable by said processor circuitry whereby said radio device is operative to, by means of a web browser in the radio device, download a web page of the website from a web server hosting the website. The radio device is also operative to receive a login request from the web server, the login request comprising a request for login information for a service from a service application of the service in the radio device. The radio device is also operative to, in response to the received login request and by means of the service application, automatically send a login token request to a server of a service provider providing the service. The radio device is also operative to, from the server of the service provider, receive a login token response comprising a login token. The radio device is also operative to, to the web server, send a login information message comprising the login token.

According to another aspect of an embodiment, there is provided a method performed by a web server for facilitating login on a website hosted on the web server. The method comprises uploading a web page of the website to a web browser of a radio device. The method also comprises sending a login request to a service application in the radio device, the login request comprising a request for login information for a service of the service application. The method also comprises, from the radio device, receiving a login information message comprising a login token. The method also comprises automatically logging in on the website by means of the received login token.

According to another aspect of an embodiment, there is provided a computer program product comprising computer-executable components for causing a web server to perform an embodiment of the method performed in the web server, when the computer-executable components are run on processor circuitry comprised in the web server.

According to another aspect of an embodiment, there is provided a web server comprising processor circuitry, and a storage unit storing instructions executable by said processor circuitry whereby said web server is operative to upload a web page of the website to a web browser of a radio device. The web server is also operative to send a login request to a service application in the radio device, the login request comprising a request for login information for a service of the service application. The web server is also operative to, from the radio device, receive a login information message comprising a login token. The web server is also operative to automatically log in on the website by means of the received login token.

It is an advantage that a user of a radio device, e.g. a smartphone or a tablet computer, who is logged into a service application (i.e. an app) running on the radio device can be automatically logged in to a web site (typically on the Internet), e.g. the corresponding web application of the same service as the service application. The user may thus be logged in without having to remember and manually enter a password. The user may continuously be logged in to the service via the app, but may have to log in to the corresponding web site of the service in order to perform an action which is not available via the app (e.g. make a purchase). Since the user is already logged in to the service (via the app) the user may be allowed to log in automatically via the web site as well by means provided by some embodiments. Alternatively, automatic log in may be available for web sites other than the web site of the provider the service of the app, e.g. if there is an agreement for such an arrangement between the service provider and the owner of the other web site where automatic log in is allowed to the web site if the user is already logged in via the service application.

It is to be noted that any feature of any of the aspects may be applied to any other aspect, wherever appropriate. Likewise, any advantage of any of the aspects may apply to any of the other aspects. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE FIGURES

Embodiments will be described, by way of example, with reference to the accompanying drawings, in which:

FIG. 1 is a schematic block diagram of an embodiment of a communication system.

FIG. 2A is a schematic block diagram of an embodiment of a radio device.

FIG. 2B is a schematic block diagram of an embodiment of a web server.

FIG. 3 is a schematic illustration of an embodiment of a computer program product.

FIG. 4 is a schematic flow chart of embodiments of a method performed in a radio device.

FIG. 5 is a schematic flow chart of embodiments of a method performed in a web server.

DETAILED DESCRIPTION

Figure 6:
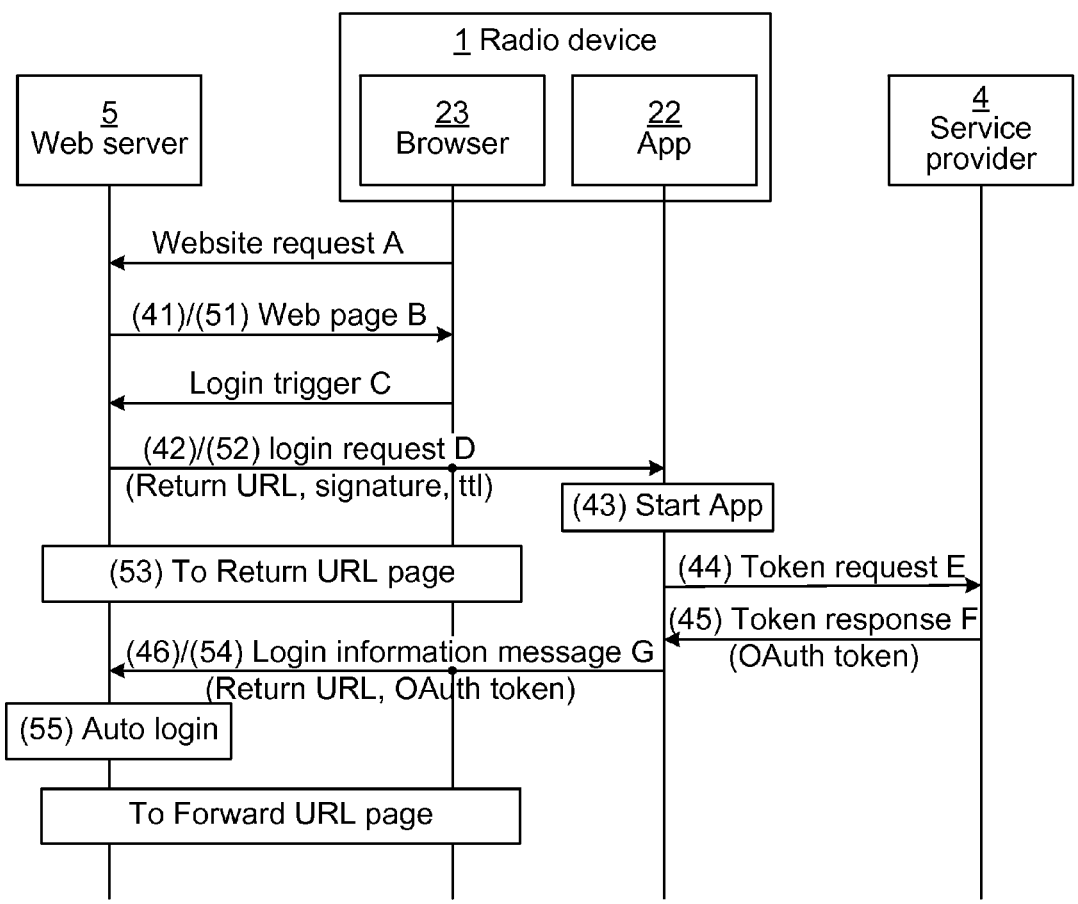
FIG. 6 is a schematic signalling diagram illustrating embodiments of the present invention.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

FIG. 1 illustrates a communication system in which embodiments may be used. A radio device 1 is connected to a service provider 4 via a base station 2 and a Packet Data Network 3, e.g. the Internet.

In accordance with an embodiment, the radio device 1 may be any device or user equipment (UE), mobile or stationary, enabled to communicate over a radio channel in a communication network, for instance but not limited to e.g. mobile phone, smartphone, modem, sensors, meters, vehicles (e.g. a car), household appliances, medical appliances, media players, cameras, or any type of consumer electronic, for instance but not limited to television, radio, lighting arrangements, tablet computer, laptop, or personal computer (PC). In accordance with an embodiment, the radio device is running a service application (app) for accessing a service, e.g. media streaming, possibly instead of accessing the service via a corresponding web application (Internet web site). In view of this situation, the radio device is typically a smartphone or a tablet computer, preferably a smartphone.

The base station 2 may be any radio base station via which the radio device 1 may connect to the PDN 3, e.g. an Access Point (AP) of a Wireless Local Area Network (WLAN) or a node of a cellular Radio Access Network (RAN) of a Third Generation Partnership Project (3GPP) communication standard, e.g. a Node B of a Wideband Code Division Multiple Access (WCDMA) standard or an evolved Node B (eNB) of a Long Term Evolution (LTE) standard.

The PDN 3 may typically be the Internet, but may alternatively be any other PDN, such as an operator network of a telecommunications operator.

In accordance with an embodiment, the service provider (SP) 4 is configured for providing a service to the radio device 1 (e.g. for the benefit of the human user of the radio device). The service may be any service, such as a media streaming service for streaming e.g. music and/or video. In accordance with an embodiment, the radio device may access the service from the SP 4 via an app installed in the radio device 1.

The radio device 1 may also connect to a web server 5 via the same or a different PDN 3, e.g., the Internet, by means of a web browser installed in the radio device. As discussed herein, the web server 5 may be a server of the SP 4 or the web server 5 may not belong to the SP 4 but may, e.g., be a web server of a service provider of another service.

FIG. 2A schematically illustrates an embodiment of a radio device 1 of the present disclosure. The radio device 1 comprises processor circuitry 21 e.g. a central processing unit (CPU). The processor circuitry 21 may comprise one or a plurality of processing units in the form of microprocessor(s). However, other suitable devices with computing capabilities could be comprised in the processor circuitry 21, e.g. an application specific integrated circuit (ASIC), a field programmable gate array (FPGA) or a complex programmable logic device (CPLD). The processor circuitry 21 is configured to run one or several computer program(s) or software (SW) 31 (see also FIG. 3) stored in a storage 24 of one or several storage unit(s) e.g. a memory. The processor circuitry may e.g. execute application SW 31A in the storage 24 to form the service application (app) 22. Similarly, the (web) browser 23 may be formed by executing dedicated SW stored in the storage 24. The storage unit is regarded as a computer readable means 32 (see also FIG. 3) as discussed herein and may e.g. be in the form of a Random Access Memory (RAM), a Flash memory or other solid state memory, or a hard disk, or be a combination thereof. The processor circuitry 21 may also be configured to store data in the storage 24, as needed. The radio device 1 also comprises a radio interface 25 for communicating via the radio base station 2 over an air interface. The radio interface comprises a transmitter, a receiver and an antenna, which may be combined to form a transceiver or be present as distinct units within the radio device 1. Further, the radio device 1 comprises a user interface (UI) 26, e.g. comprising a touchscreen and/or buttons/keys, allowing the user of the radio device to input commands to the radio device.

FIG. 2B schematically illustrates an embodiment of a web server 5 of the present disclosure. The web server 5 comprises processor circuitry 26 e.g. a central processing unit (CPU). The processor circuitry 26 may comprise one or a plurality of processing units in the form of microprocessor(s). However, other suitable devices with computing capabilities could be comprised in the processor circuitry 26, e.g. an application specific integrated circuit (ASIC), a field programmable gate array (FPGA) or a complex programmable logic device (CPLD). The processor circuitry 26 is configured to run one or several computer program(s) or software (SW) 33 (see also FIG. 3) stored in a storage 27 of one or several storage unit(s) e.g. a memory. The storage unit is regarded as a computer readable means 32 (see FIG. 3) as discussed herein and may e.g. be in the form of a Random Access Memory (RAM), a Flash memory or other solid state memory, or a hard disk, or be a combination thereof. The processor circuitry 26 may also be configured to store data in the storage 27, as needed. The web server 5 also comprises a communication interface 28 for communicating via the PDN 3 and the radio base station 2.

FIG. 3 illustrates a computer program product 30. The computer program product 30 comprises a computer readable (e.g. non-volatile) medium 32 comprising a computer program 31/33 in the form of computer-executable components. The computer program/computer-executable components 31/33 may be configured to cause a device, e.g. a radio device 1 or a web server 5 as discussed herein, to perform an embodiment of a method of the present disclosure. The computer program/computer-executable components may be run on the processor circuitry 21/26 of the device 1/5 for causing the device to perform the method. The computer program product 30 may e.g. be comprised in a storage unit or memory 24/27 comprised in the device 1/5 and associated with the processor circuitry 21/26. Alternatively, the computer program product 30 may be, or be part of, a separate, e.g. mobile, storage means, such as a computer readable disc, e.g. CD or DVD or hard disc/drive, or a solid state storage medium, e.g. a RAM or Flash memory.

FIG. 4 is a schematic flow chart of embodiments of a method performed in a radio device 1, in accordance with an embodiment. The method is for facilitating login on a website hosted on a web server 5.

In accordance with an embodiment, by means of the web browser 23 in the radio device, a web page of the website is downloaded 41 from the web server 5 hosting the website. The web page may be a login web page for logging in to the website, or the web page may comprise a clickable option which requires the user to login to the website. Thus the user may click on a button, e.g., for making a purchase (which requires the user to be logged in to be executed). In some embodiments, the login request is triggered by a user of the radio device 1 inputting a command to the downloaded 41 web page via the user interface 26 of the radio device.

In accordance with an embodiment, a login request is received from the web server 5, the login request comprises a request for login information for a service from the service application 22 of the service, the service application running in the radio device. The login request, which may have been triggered by an action of the user on the web page or by simply entering (downloading) the web page is sent from the web server 5 to the app 22. Typically, the user is already logged in to the service via the app 22, allowing the user to be automatically logged in to the web site on the web server 5.

In accordance with an embodiment, in response to the received 42 login request and by means of the service application 22, the radio device 1 automatically sends 44 a login token request to a server of a service provider 4 providing the service. Optionally, if the app 22 is not currently running on the radio device 1, the radio device in response to the received 42 login request and before automatically sending 44 the login token request, starts 43 the service application 22 by running application software 31A stored in the radio device. As previously mentioned, the web server 5 may or may not be a server of the SP 4, why the radio device may in some embodiments send 44 the login token request to the web server 5. However, login information is typically held in a separate server of the SP 4.

In accordance with an embodiment, then, from the server of the service provider 4, the radio device 1 (typically the app 22 in the radio device) receives 45 a login token response comprising a login token. The token may be in accordance with the OAuth authorization standard.

In accordance with an embodiment, then the radio device sends 46, to the web server 5, a login information message comprising the login token. The login token allows the web server 5 to automatically log in the user to the website.

FIG. 5 is a schematic flow chart of embodiments of a method performed in a web server 5. The method is for facilitating login on a website hosted on the web server and may be the corresponding web server method to the radio device method discussed in relation to FIG. 4. The discussion in relation to FIG. 4 is thus in applicable parts also relevant to the method of FIG. 5.

In accordance with an embodiment, the web server uploads 51 a web page of the website to a web browser 23 of the radio device 1. Then, the web server sends 52 the login request to the service application 22 in the radio device. The login request comprises a request for login information for a service of the service application. The login information is information allowing the web server to log in the user of the radio device 1 to log on to the service via the website. In response, the web server 5 receives 54, from the radio device 1, the login information message comprising the login token. Optionally, the web server 5 may, before the receiving 54 of the login information message, upload 53 the web page of a Return URL to the web browser 23. The login information message may comprise the Return URL of a web page on the website, and wherein the login token may be for logging in on the web page of the Return URL. Then, the web server automatically logs in 55 on the website by means of the received 54 login token. Thus, the user of the radio device has automatically been logged in on the website, via the browser 23, by being already logged in to the service via the app 22.

In some embodiments, the login request comprises a private key, corresponding to a public key held by the service application 22, i.e. the login request to the app 22 is signed with the private key. The data of the login request may be hashed, and the hash may be encrypted with the private key, whereby the encrypted hash is the signature with which the login request is signed. Thus, the app 22 can verify that the login request has been sent by a an element which knows the private key, allowing the service application to verify that the web server 5 is authorized to receive the login information which it asks for with the login request.

In some embodiments, the login request comprises a Return URL, informing the radio device on which web page the login information should be used. The login request may be in accordance with a Custom URL Scheme, e.g., of Android or iOS.

FIG. 6 is a schematic signalling diagram illustrating embodiments of the present invention. It should again be noted that the web server 5 may or may not be a server of the service provider 4. For clarity, the web server 5 has been positioned separate from the service provider 4 in FIG. 6.

In accordance with an embodiment, the web browser 23, typically on instructions from the user of the radio device 1, requests to enter a website (or a specific page of the website) by sending a website request A to the web server 5 hosting the website. In response, the webserver uploads S1/51 web page B to the web browser. Optionally, the web browser 23 sends a login trigger C to the web server 5 (e.g. as a result of input from the user via the UI 26 as discussed herein). In response to the login trigger C, or to the uploading of the webpage B, the web server 5 sends S2/52 a login request D to the app 22 via the browser 23. The login request D may comprise a signature of a private key (to verify that the web server is authorised to request the login), a ttl (for specifying how long the request is valid) and/or a Return URL which is the URL of the webpage on which the login should be executed.

In accordance with an embodiment, the login request D prompts the radio device 1 to start 43 the app 22 (if it is not already running). In reaction to the received login request D, the app 22 sends 44 a token request E to the SP 4, requesting a login token from the SP 4 for logging in the user of the radio device 1 to the website hosted by the web server 5 (e.g. a website of the SP 4). In response, the SP 4 sends a token response F comprising the login token, e.g. an OAuth token. In the meantime, the web browser 23 may download 53 the webpage of the Return URL (in this way, the user will access the Return URL page even if automatic login fails, e.g. because the user is not logged in via the app 22 or if the user does not have the app installed on the radio device).

In accordance with an embodiment, the app 22 sends 46/54, via the browser 23, a login information message G to the web server 5. The login information message G comprises the login token, e.g. in the fragment part of the Return URL (#OAuthtoken). By means of the received login token, the web server 5 can then automatically login 55 the user to the website. Optionally, the login webpage (e.g. the Return URL page) may comprise a Forward URL, prompting the web browser 23 to download the webpage of the Forward URL upon the automatic login 55.

Thus, a user can be automatically logged in to a website by means of already being logged in to a service via an app, without having to actively log in or otherwise approve login on the website.

Below follow some other aspects of embodiments of the present invention.

According to an aspect of an embodiment, there is provided a computer program 31 comprising computer program code which is able to: when run on processor circuitry 21 of a radio device 1, cause the radio device to, by means of a web browser 23 in the radio device, download 41 a web page B of the website from a web server 5 hosting the website; receive 42 a login request D from the web server 5, the login request comprising a request for login information for a service from a service application 22 of the service in the radio device; in response to the received 42 login request D and by means of the service application 22, automatically send 44 a login token request E to a server of a service provider 4 providing the service; from the server of the service provider 4, receive 45 a login token response F comprising a login token; and, to the web server 5, send 46 a login information message G comprising the login token.

According to another aspect of an embodiment, there is provided a computer program 33 comprising computer program code which is able to, when run on processor circuitry 26 of a web server 5, cause the web server to: upload 51 a web page B of the website to a web browser 23 of a radio device 1; send 52 a login request D to a service application 22 in the radio device, the login request comprising a request for login information for a service of the service application; from the radio device 1, receive 54 a login information message G comprising a login token; and automatically log in 55 on the website by means of the received 54 login token.

According to another aspect of an embodiment, there is provided a computer program product 30 comprising a computer program 31 or 33 and a computer readable means 32 on which the computer program is stored.

According to another aspect of an embodiment, there is provided a radio device 1 comprising: means for, by means of a web browser 23 in the radio device, downloading 41 a web page B of the website from a web server 5 hosting the website; means for receiving 42 a login request D from the web server 5, the login request comprising a request for login information for a service from a service application 22 of the service in the radio device; means for, in response to the received 42 login request D and by means of the service application 22, automatically sending 44 a login token request E to a server of a service provider 4 providing the service; means for, from the server of the service provider 4, receiving 45 a login token response F comprising a login token; and means for, to the web server 5, sending 46 a login information message G comprising the login token.

According to another aspect of an embodiment, there is provided a web server 5 comprising: means for uploading 51 a web page B of a website to a web browser 23 of a radio device 1; means for sending 52 a login request D to a service application 22 in the radio device, the login request comprising a request for login information for a service of the service application; means for, from the radio device 1, receiving 54 a login information message G comprising a login token; and means for automatically logging in 55 on the website by means of the received 54 login token.

Embodiments of the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The present disclosure has mainly been described above with reference to a few embodiments. However, as is readily appreciated by a person skilled in the art, other embodiments than the ones disclosed above are equally possible within the scope of the present disclosure, as defined by the appended claims.

What is claimed is:

1. A method performed in a radio device for facilitating login on a website, the method comprising:
providing, at a radio device,
a web browser operable to access a website, and
a service application operable to access a service at a service provider;
by means of the web browser in the radio device, downloading a web page of the website, from a web server hosting the website;
receiving, at the radio device, a login request from the web server, the login request comprising a request for login information for the service from the service application of the service in the radio device;
in response to the received login request, and by means of the service application, automatically sending a login token request from the service application at the radio device, to a server of the service provider providing the service;
from the server of the service provider, receiving, at the service application at the radio device, a login token response comprising a login token; and
to the web server, sending a login information message comprising the login token, to automatically log in a user to the website.

2. The method of claim 1, wherein the login request comprises a private key, corresponding to a public key of the service application, allowing the service application to verify that the web server is authorized to receive the login information.

3. The method of claim 2, wherein the receiving of the login request is triggered by a user of the radio device inputting a command to the downloaded web page via a user interface of the radio device.

4. The method of claim 3, further comprising:
in response to the received login request and before automatically sending the login token request, starting the service application by running application software stored in the radio device.

5. The method of claim 2, further comprising:
in response to the received login request and before automatically sending the login token request, starting the service application by running application software stored in the radio device.

6. The method of claim 1, wherein the receiving of the login request is triggered by a user of the radio device inputting a command to the downloaded web page via a user interface of the radio device.

7. The method of claim 6, further comprising:
in response to the received login request and before automatically sending the login token request, starting the service application by running application software stored in the radio device.

8. The method of claim 1, further comprising:
in response to the received login request and before automatically sending the login token request, starting the service application by running application software stored in the radio device.

9. The method of claim 1, wherein the login request comprises a Return URL, informing the radio device on which web page the login information should be used.

10. The method of claim 1, wherein the login request is a Custom URL Scheme message.

11. The method of claim 1, wherein the login token is an OAuth token.

12. The method of claim 1, wherein information provided by the user already being logged in to the service application, is used to create the login token.

13. The method of claim 1, further comprising using an automatic login for other websites than the website associated with the service provider, wherein the other websites allow automatic log in if the user is already logged in via the service application.

14. The method of claim 1, wherein at least one of the website or web page includes a clickable option which, upon selection, requires the user to login to the website.

15. A non-transitory computer readable storage medium comprising computer-executable instructions stored thereon, that when executed cause a radio device to perform the method comprising:
providing, at a radio device,
a web browser operable to access a website, and
a service application operable to access a service at a service provider;
by means of the web browser in the radio device, downloading a web page of the website, from a web server hosting the website;
receiving, at the radio device, a login request from the web server, the login request comprising a request for login information for the service from the service application of the service in the radio device;
in response to the received login request, and by means of the service application, automatically sending a login token request from the service application at the radio device, to a server of the service provider providing the service;
from the server of the service provider, receiving, at the service application at the radio device, a login token response comprising a login token; and
to the web server, sending a login information message comprising the login token, to automatically log in a user to the website.

16. A radio device comprising:
processor circuitry; and
a storage unit storing instructions executable by said processor circuitry whereby said radio device is operative to:
provide, at the radio device,
a web browser operable to access a website, and
a service application operable to access a service at a service provider;
by means of the web browser in the radio device, download a web page of the website from a web server hosting the website;
receive, at the radio device, a login request from the web server, the login request comprising a request for login information for the service from the service application of the service in the radio device;
in response to the received login request and by means of the service application, automatically send a login token request from the service application at the radio device, to a server of the service provider providing the service;
from the server of the service provider, receive, at the service application at the radio device, a login token response comprising a login token; and
to the web server, send a login information message comprising the login token, to automatically log in a user to the website.

17. A method performed by a web server for facilitating login on a website hosted on the web server, the method comprising:
    uploading a web page of a website to a web browser of a radio device, wherein the radio device comprises
        a web browser operable to access the website, and
        a service application operable to access a service at a service provider;
    sending a login request to the service application in the radio device, the login request comprising a request for login information for the service of the service application, wherein in response to the received login request and by means of the service application, the radio device automatically
        sends a login token request from the service application at the radio device, to a server of the service provider providing the service, and
        from the server of the service provider, receives, at the service application at the radio device, a login token response comprising a login token;
    from the radio device, receiving a login information message comprising a login token; and
    automatically logging in a user to the website by means of the received login token.

18. The method of claim 17, wherein the login request comprises a private key, corresponding to a public key of the service application, allowing the service application to verify that the web server is authorized to receive the login information.

19. The method of claim 17, wherein the login information message comprises a Return URL of a web page on the website, and wherein the logging in is on the web page of the Return URL.

20. The method of claim 19, further comprising:
    before the receiving of the login information message, uploading the web page of the Return URL to the web browser.

21. The method of claim 17, wherein computer-executable instructions to perform the method are stored in a non-transitory computer readable storage medium, and cause the web server to perform the method when the computer-executable instructions are run on processor circuitry comprised in the web server.

22. The method of claim 17, wherein the web server comprises:
    processor circuitry, and
    a storage unit storing instructions executable by said processor circuitry,
    which instructions when executed by said processor circuitry cause said web server to perform the method.

* * * * *